Oct. 22, 1963

A. BUDNICK ETAL 3,107,579

HOBBING MACHINE

Filed Jan. 29, 1960

INVENTORS
ARNO BUDNICK
FRANZ FRANKE
BY
Hopgood and Calimafde
ATTORNEYS.

INVENTORS
ARNO BUDNICK
FRANZ FRANKE
BY
Hopgood and Calimafde
ATTORNEYS.

United States Patent Office 3,107,579
Patented Oct. 22, 1963

3,107,579

HOBBING MACHINE

Arno Budnick and Franz Franke, Ludwigsburg, Wurttemberg, Germany, assignors to Firma Hermann Pfauter, Ludwigsburg, Germany Filed Jan. 29, 1960, Ser. No. 5,511
3 Claims. (Cl. 90—4)

The invention relates to gear hobbing machines with which spur gears and worm gears can be toothed. Such machines are sometimes equipped with three feed spindles with which the cutter can be shifted in three different directions relatively to the work piece. With one of the spindles the feed is actuated parallel to the axis of the work piece, i.e. in an axial direction; with the second feed spindle in vertical direction relatively to the axis of the work piece, i.e. radial relatively to the work piece; and with the third feed spindle the feed is actuated tangentially relatively to the work piece. The latter feed is used when a worm gear toothing is machined according to the tangential process or if, during the milling of a spur gear the cutter shall be continually moved in the direction of its axis in order to evenly distribute the wear over its total length, to increase its life and to obtain an especially good surface of the flanks of the teeth.

Often it is advantageous or necessary to machine simultaneously with two feeds. For instance, this is necessary when for the machining of a spur gear the starting cut has to be actuated with a radial feed which is directed vertically relatively to the axis of the work piece and at the same time it is desirable or necessary to shift the cutter in the direction of its axis. Therefore, in such a case, machining is started with radial and tangential feed and, after the cutter has cut into the work piece to the depth of the tooth, the radial feed has to be cut-out and replaced by the axial feed. In other words, machining is continued with the axial and tangential feed.

To enable such working conditions, the drive of all three feeds is, in accordance with the invention, arranged independently from each other. As for the machining of helical spur gears where additional rotation of the work piece is required besides the axial feed parallel to the axis of the work piece, the gear train of the axial feed is connected with a differential drive which provides this additional rotation of the work piece. Furthermore, also the tangential feed of the cutter tangential to the work piece requires an additional rotation of the work piece. According to the invention the latter additional rotation is obtained by a second differential drive which operates independently from the first differential drive. The second differential drive is powered by the gear train for the tangential feed. The figures show how the complete gear train of the hobbing machine is arranged in accordance with the invention.

Figure 1:
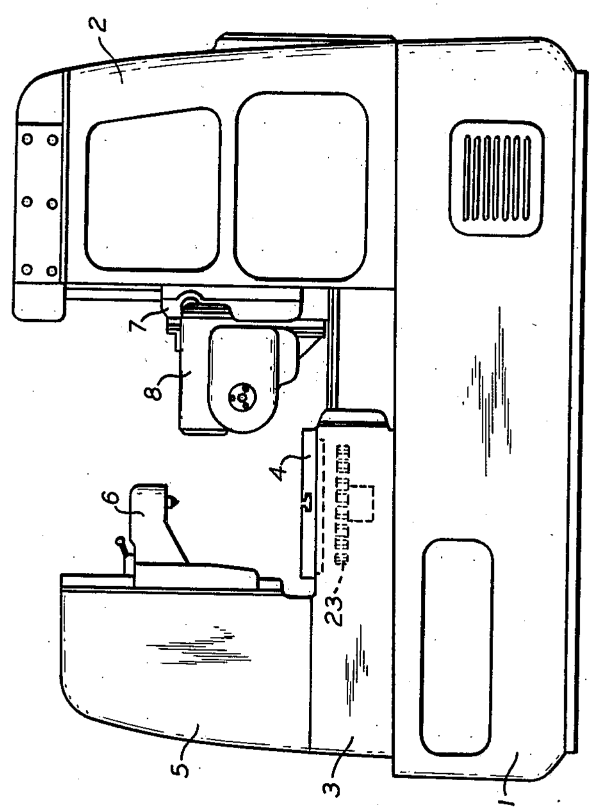
FIG. 1 shows a view of the hobbing machine.

Column 2 is mounted on bed 1 and the table slide is mounted on the column for horizontal movement relatively to the column. The table slide 3 carries the table 4 which is rotating on its vertical axis; on said table the work pieces are being clamped. Furthermore the support column 5 with arbor support 6 is also mounted on the table slide.

Hob slide 7 is mounted on column 2 for vertical movement in a guide relatively to the column 2. Hob head 8, mounted on slide 7, is arranged for tilting movement on a horizontal axis and can be tilted to correspond with the angle of tooth of the helical gear to be hobbed.

Figure 2:
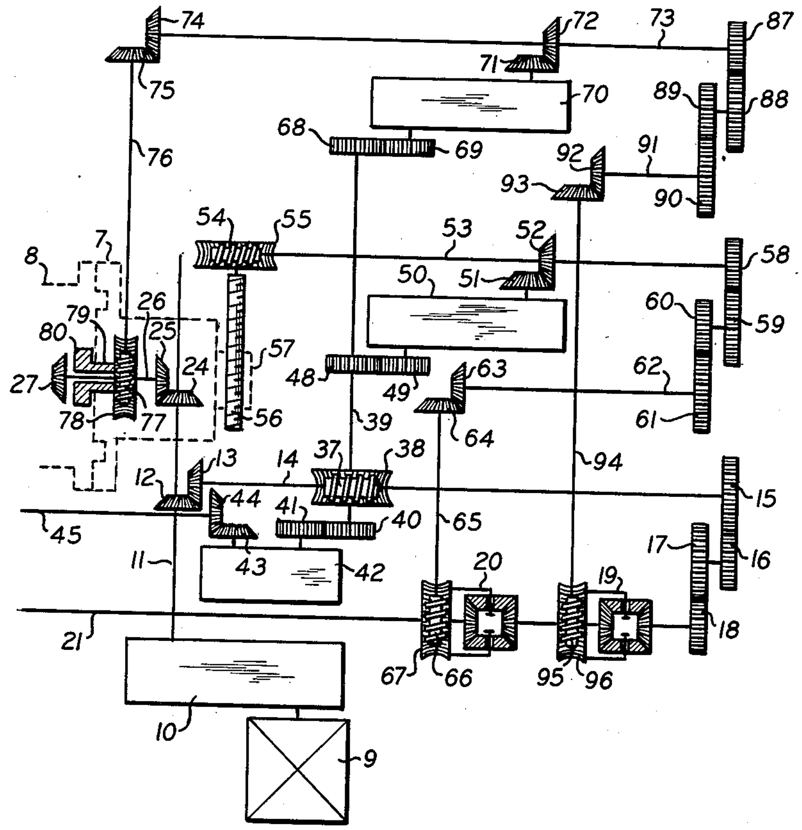
FIGURES 2 and 3 show the schematic arrangement of the gear trains of the machine.

In FIG. 2 the drive motor 9 is shown schematically.

The motor drives the vertical shaft 11 by means of a drive in housing 10 which can adjust the rotation of the shaft in either direction and at any desirable speed. In most cases an infinitely variable drive is provided for this purpose.

Shaft 11 is rigidly connected with bevel gear 12 driving shaft 14 via its counter gear 13, as well as shaft 21 via change gears 15 to 18 and index worm 22. The latter is slidingly arranged on index shaft 21 corresponding to the sliding position of table slide 3. Index worm drives index gear 23 which is mounted in the slide 3.

Figure 3:
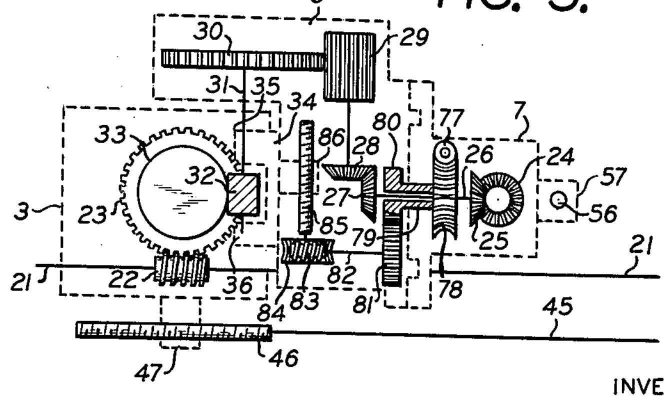

On shaft 21 the two differential drives 19 and 20 are arranged between change gear 18 and index worm 22, said drives providing the additional rotation which is in proportion to the axial feed or tangential feed respectively. On the vertical shaft 11 the bevel gear 24 is arranged for longitudinal movement. Said bevel gear is mounted in the hob slide 7 and by means of counter gear 25 drives shaft 26, the bevel gear drive 27/28 (FIGURE 3), back gears 29/30 and hob spindle 31 on which the cutter is mounted for hobbing the work piece 33. The hob arbor is mounted in bearings 35 and 36 on the tangential slide 34 which is arranged for longitudinal movement in line with the hob spindle 31 relatively to the hob head 8, i.e. in line with the hob axis.

On shaft 14 the worm 37 is mounted which drives worm wheel 38 on shaft 39. By means of helical gears 40 and 41 the shaft 39 drives the drive in housing 42. Very often that drive is an infinitely variable change gear which allows to change not only the ratio but also the direction of its rotation. Via bevel gear 43/44 and shaft 45 the power is transmitted to the radial feed spindle 46 which by means of nut 47 is shifting the table slide 3 vertically relatively to the axis of the work piece.

By means of helical gears 48/49 the shaft 39 is further driving the drive in housing 50 by which the ratio and the direction of rotation can be changed. Via the pair of bevel gears 51/52 the power is transmitted to shaft 53 which, on the one hand, is driving the axial feed spindle 56 by means of worm 54 and worm wheel 55. By means of nut 57 the axial feed spindle 56 is shifting the hob slide 7 in vertical direction relatively to column 2, i.e. parallel to the axis of the work piece. On the other hand, shaft 53 is driving the worm 66 by means of change gears 58, 59, 60, 61; shaft 62, bevel gears 63/64 and shaft 65, thereby actuating worm wheel 67 which is connected with the web of the differential drive. Finally, via spur gear drive 68 and 69 shaft 39 is driving the ratio and direction change gear in housing 70 as well as bevel gears 74/75, shaft 76, worm 77 and worm wheel 78. Thereby, worm 77 is mounted in the hob slide 7 and connected with shaft 76 for longitudinal movement. From worm wheel 78 the power is transmitted to the tangential feed spindle 85 via a hollow shaft 79, spur gears 80/81, shaft 82, worm 83 and worm wheel 84. Via nut 86 the tangential feed spindle is moving the tangential slide 34 with which that nut is rigidly connected. The hollow shaft 79 and hob drive shaft 26 have the same axis. On that axis the hob head 8 is tiltably mounted at the hob slide 7 and can be clamped in any desired angular position.

From shaft 73 power is directed to worm 95 via the change gears 87, 88, 89 and 90, as well as shaft 91 (bevel gears 92/93) and shaft 94. Via worm wheel 96 the worm is providing the web of the differential drive 19 with the additional rotation corresponding to the value of the tangential feed.

As is well known by the art the change gears 15, 16, 17 and 18 have to be selected and changed in correspondence with the number of starts of the hob and the number of teeth of the work piece to be machined.

The differential change gears 58, 59, 60 and 61 are dependent—as known by those skilled in the art—on the module and the angle of the gearing to be obtained on the work piece. The differential change gears 87, 88, 89 and 90 have to be changed with regard to their size corresponding with the lead of the hob 32.

If the three groups of change gears have been selected and installed for a certain work piece then, during the machining of the toothing, the drives 42, 50 and 70 can be changed ad libitum and adjusted independently from each other but in correspondence with the cutting conditions of hob 32. The hob 32, however, maintains at all times the correct setting relatively to the toothing of the work piece. It has been proved advantageous if the three drives 42, 50 and 70 are infinitely variable.

The two differential drives can, naturally, also be located in any other place of the machine. For instance, the differential drive 19 could either be arranged on shaft 62 or on shaft 65. Thereby, only the computation formula for the change gears 87 to 90 will change slightly, its dependence on the lead of the hob, however, would remain unchanged.

We claim:

1. A machine for hobbing a work piece comprising:
hobbing means for said work piece movable in axial and tangential relationship with respect to said work piece,
axial moving means for axially moving said hobbing means,
tangential moving means for tangentially moving said hobbing means,
independent means for rotating said work piece including two differential transmissions,
means coupling said axial moving means to one of said differential transmissions of said independent rotating means to produce additional rotation of said rotating means depending on the axial movement of said hobbing means,
and means coupling said tangential moving means to the other of said differential transmissions to produce additional rotation of said rotating means depending on the tangential movement of said hobbing means,
said axial and tangential moving means being drivewise independent of each other.

2. In a gear hobbing machine for hobbing a cylindrical work piece and providing drive means therein for rotating said cylindrical work piece about its axis, said gear hobbing machine including a hob and means mounting said hob adjacent said cylindrical work piece, said hob being movable on said means in the axial and tangential directions relative to said cylindrical work piece; further drive means for rotating said cylindrical work piece about its axis to thereby vary the rotation thereof relative to the axial and tangential movements of said hob, said further drive means comprising, first and second independent driving means for moving said hob in said axial and said tangential directions respectively, first and second differential means, said first and second driving means being also operatively connected independently to said drive means through said first and second differential means respectively to provide additional rotation of said cylindrical work piece corresponding respectively to said axial and tangential movements of said hob.

3. In the gear hobbing machine of claim 1 wherein said drive means for rotating said cylindrical work piece and said first and second driving means for moving said hob in said axial and said tangential directions respectively are gear trains, said first driving means for moving said hob in said axial direction includes change gear means intermediate said hob and said first differential means for transmitting a proportionate rate of drive of said first driving means to said drive means for rotating said cylindrical work piece via said first differential means, and said second driving means for moving said hob in said tangential direction includes further change gear means for transmitting a proportionate rate of drive of said second driving means to said drive means for rotating said cylindrical work piece via said second differential means.

References Cited in the file of this patent

UNITED STATES PATENTS

| | | |
|---|---|---|
| 2,374,254 | Zimmermann | Apr. 24, 1945 |
| 2,837,010 | Davenport | June 3, 1958 |
| 2,856,834 | Berthiez | Oct. 21, 1958 |